(12) United States Patent
Thiebaud et al.

(10) Patent No.: US 11,288,881 B2
(45) Date of Patent: Mar. 29, 2022

(54) METHOD AND SYSTEM FOR COLOR GRADING A VIRTUAL REALITY VIDEO CONTENT

(71) Applicant: Thomson Licensing, Cesson-Sevigne (FR)

(72) Inventors: Sylvain Thiebaud, Cesson-Sevigne (FR); Tania Pouli, Cesson-Sevigne (FR)

(73) Assignee: Thomson Licensing, Cesson-Sevigne (FR)

( * ) Notice: Subject to any disclaimer, the term of this patent is extended or adjusted under 35 U.S.C. 154(b) by 172 days.

(21) Appl. No.: 16/764,412

(22) PCT Filed: Nov. 22, 2018

(86) PCT No.: PCT/EP2018/082225
§ 371 (c)(1),
(2) Date: May 15, 2020

(87) PCT Pub. No.: WO2019/101857
PCT Pub. Date: May 31, 2019

(65) Prior Publication Data
US 2021/0366204 A1    Nov. 25, 2021

(30) Foreign Application Priority Data

Nov. 24, 2017  (EP) .................................. 17306636.6

(51) Int. Cl.
*G09G 5/00* (2006.01)
*G06T 19/20* (2011.01)
(Continued)

(52) U.S. Cl.
CPC .............. *G06T 19/20* (2013.01); *G06F 3/012* (2013.01); *G06F 3/014* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2012/0280910 A1* | 11/2012 | Brinkman | G06F 3/014 345/158 |
| 2015/0212641 A1* | 7/2015 | Tanneberger | G06F 3/0412 345/173 |

OTHER PUBLICATIONS

Nguyen Cuong et al. "Vremiere: In-Hedset Virtual Reality Editing", Proceedings of the 2017 CHI Conference on Human Factors in Computer Systems, pp. 5428-5438 (May 2, 2017).

(Continued)

*Primary Examiner* — Insa Sadio
(74) *Attorney, Agent, or Firm* — Vincent Edward Duffy

(57) ABSTRACT

The present disclosure relates to a method for providing assistance to a colorist in color grading of a virtual reality video content, called VR content. The method includes receiving the VR content being graded by a color grading station and receiving position information representative of the position of at least one hand of a colorist versus the color grading station. The method further includes generating, based on the position information, visual control information showing the position of the at least one hand of the colorist versus at least one grading control element of the color grading station and displaying the visual control information together with the graded VR content on a head mounted display carried by the colorist in order to help the colorist manipulating the at least one grading control element.

14 Claims, 3 Drawing Sheets

(51) Int. Cl.
*G06T 7/73* (2017.01)
*G06T 7/90* (2017.01)
*G06F 3/01* (2006.01)
*G06F 3/04815* (2022.01)
*G06F 3/04845* (2022.01)
*G06T 19/00* (2011.01)

(52) U.S. Cl.
CPC ...... *G06F 3/04815* (2013.01); *G06F 3/04845* (2013.01); *G06T 7/73* (2017.01); *G06T 7/90* (2017.01); *G06T 19/006* (2013.01); *G06T 2200/24* (2013.01); *G06T 2207/10016* (2013.01); *G06T 2207/30196* (2013.01); *G06T 2207/30204* (2013.01); *G06T 2210/62* (2013.01); *G06T 2219/2012* (2013.01)

(56) References Cited

OTHER PUBLICATIONS

Dominic Brennan Adobe Premiere Pro Now Includes VR Editing Interface, www.roadtovr.comadobe-premiere-pro-now-included-vr-editing-interface-project-clovervt, (Oct. 18, 2017).
Xie Jinhong et al. "Hand Posture Recognition using Kinect", 2015 International Conference on Virtual Reality and Visualization, IEEE, pp. 89-92 (Oct. 17, 2015).
Adi Robertson "Logitech made a VR keyboard kit so you can type in the Vive—The Verge", www.theverge.com/2017/11/3/16602674/logitech-bridge-sdk-vive-tracker-keyboard (Nov. 3, 2017).
Nguyen Cuong et al. "Vremiere: In-Headset Virtual Reality Editing" www.web.archive.org/web/20170722062450/http://web.cecs.pdx.edu/~fliu/project/vremiere—Abstract (Jul. 22, 2071).
Stephen Diverdi "#CloverVR. Adobe Max 2016 (Sneek Peaks) Adobe Creative Cloud", https://youtu.be/tFkJXwH1VTE (Nov. 4, 2016).
Anonymous "360VR Video Post Production with Adobe Premiere Pro CC2018" www.youtube.com/watch?v=PZHaBCaeMPY (Oct. 23, 2017).

* cited by examiner $\theta_p$: physical rotation angle $\theta_c$: rotation within the VR content

METHOD AND SYSTEM FOR COLOR GRADING A VIRTUAL REALITY VIDEO CONTENT

This application claims the benefit, under 35 U.S.C. § 365 of International Application PCT/EP2018/082225, filed Nov. 22, 2018, which was published in accordance with PCT Article 21(2) on May 31, 2019, in English and which further claims the benefit of priority application EP17306636.6, filed on Nov. 24, 2017.

1. TECHNICAL FIELD

The present disclosure relates generally to the field of the production of Virtual reality (VR) contents and more specifically to the color grading of VR contents.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the domain of the production of Virtual Reality contents, colorists may have to grade 360° VR contents. Colorists working on color grading for films usually use dedicated color grading stations, such as the "DaVinci Resolve" color grading station. Such stations offer them quick access to the parameters and controls of the color grading software so that they can modify the content without having to manipulate different buttons, sliders or menus or screen. For a typical color grading session, colorists need to be able to access to the multiple controls available on the station to perform color editing, while at the same time visualizing the effect of modifications on the content on specialized monitors or projectors in front of them.

When grading VR content, the grading could mainly be performed using the same setup, working for instance on key frames issued from the 360° VR content. However, in that case, the conditions of visualization while color grading would be quite different from the final conditions where the content would be viewed, which would be through a VR head mounted display (HMD).

Colorists should be able to validate the final rendering and to adjust the grading of VR contents with a HMD, in the real conditions of visualization. Unfortunately, with the HMD, colorists cannot see the color grading station anymore and as such would not be able to access easily the controls for modifying the image. As a result, they are currently required to color grade on a traditional setup, verify on the HMD and iterate until the desired result is obtained, which is a tedious process.

This is particularly problematic since every time they would need to put on or take off the VR HMD, a short period of adaptation would be necessary to ensure that they are well adapted to the different viewing environment (normal screen or HMD).

3. SUMMARY

A purpose of the present disclosure is to propose a method and a system making easier the work of the colorist.

More specifically, it is proposed a method and system helping the colorist to use the current grading stations and control stations, while visualizing his adjustments in a HMD, without having to iterate by putting on and taking off the HMD repeatedly. The colorist can navigate in the 360° VR content to grade the content in visual conditions as close as possible as the final visualization conditions.

This system could be an additional feature added to the current grading setups used for conventional film grading. As such, colorists would not have to use dedicated stations for VR grading, but could use the same tools as the tools used for legacy films.

The disclosure relates to a method for providing assistance to (or assisting or aiding) a colorist in color grading of a virtual reality video content, called VR content, said method comprising the steps of:

receiving the VR content being graded by a color grading station, receiving position information representative of the position of at least one hand of a colorist versus said color grading station, generating, based on said position information, visual control information showing the position of said at least one hand of the colorist versus at least one grading control element of the color grading station, displaying said visual control information together with the graded VR content on a head mounted display carried by said colorist in order to help the colorist manipulating said at least one grading control element. Thus, visual information about the colorist's hands and color grading station are integrated into the VR view, therefore offering the possibility for the colorist to interact with his color grading station, while simultaneously visualizing the content in a HMD. Thus, the disclosure addresses the issue of navigating within the VR content while being able to access the color grading station.

According to a particular embodiment, the visual control information are displayed next to the VR content being graded. The VR content is displayed in a first area of the HMD while the visual control information is displayed in a second area of the HMD, said second area being distinct from the first area. In this case, the field of view dedicated to the VR content in the HMD is reduced to display the visual control information.

In a variant, the VR content and the visual control information are displayed in a same area of the head mounted display, the visual control information being superimposed on the VR content.

In a particular embodiment, the VR content is displayed full screen, and the visual control information are displayed in semi-transparency mode overlaid onto the VR content.

In a particular embodiment, the position information is based on video images captured by a camera placed above the color grading station.

In a particular embodiment, the visual control information are virtual images of the hands of the colorist and the grading control elements of the color grading station.

In a particular embodiment, the position of the hands of the colorist versus the color grading station is estimated by detecting skin tones in video images captured by a camera placed above the color grading station.

In a particular embodiment, the position of the hands of the colorist versus a color grading station is estimated by dedicated markers placed on the hands of the colorist. For this embodiment, the colorist wears for instance gloves with said dedicated markers.

In a variant, the method further comprises a step of estimating the position of the grading control elements of the color grading station, for example by use of dedicated markers placed on the grading control elements of the color grading station. In a particular embodiment, the head mounted display being arranged to estimate the physical rotation of the colorist wearing said head mounted display, the method further comprises a step for mapping to said physical rotation a rotation within the virtual reality video content, called content rotation, said content rotation being greater than said physical rotation, the virtual reality video content being displayed with said content rotation on said head mounted display.

This feature allows improving the ability for the colorist to navigate within the 360° VR content. In real viewing conditions, the 360° content can be typically explored by rotating the HMD either by moving the head of the user or the user moving totally. To manipulate aspects of the content, for instance in gaming applications, the user will normally hold a controller such as a game controller in their hands, which can be moved with them. In the present use case of color grading however, the color grading station used by the colorist is fixed in place and may be too impractical or even impossible to move. As such, the colorist must be able to access his physical grading control elements in front of him, while being able to explore the full 360° of the VR content.

To address this point, the above-mentioned mapping operation compresses the physical rotation into a smaller rotation, such that a smaller angle of rotation of the HMD corresponds to a larger angle of rotation of the VR content itself. With this mapping, the HMD does not need to be spun a full 180° to access the content behind the point of view of the user. As such, the colorist could for instance rotate his head from 60° left to 60° right to access the whole 360° content.

In a particular embodiment, a ratio between the content rotation and the physical rotation is a constant value greater than 1. The ratio is for example substantially equal to 3 such that the colorist could rotate his head from 60° left to 60° right to access VR content from −180° to +180°.

The disclosure also relates to a processing device for providing assistance to a colorist in color grading of a virtual reality video content, called VR content, said processing device being configured to
  receive the VR content being graded by a color grading station,
  receive position information representative of the position of at least one hand of a colorist versus said color grading station, • generate, based on said position information, visual control information showing the position of said at least one hand of the colorist versus at least one grading control element of the color grading station, and
  generate a video stream comprising said visual control information and said graded VR content, said video stream being arranged to be displayed by a head mounted display carried by said colorist such that said visual control information is displayed together with said graded VR content in order to help the colorist manipulating said at least one grading control element.

All or parts of the processing device may be incorporated into the color grading station and/or the head mounted display or may be an external device.

The disclosure also relates to a system for color grading a virtual reality video content comprising:
  a color grading station for grading said virtual reality video content, said color grading station comprising control elements for controlling the grading of the virtual reality video content,
  a camera for capturing video images of at least one hand of a colorist using said color grading station and generating position information representative of the position of at least one hand of the colorist versus a color grading station, and
  a processing device configured to
  receive the virtual reality video content being graded by the color grading station and said position information,
  generate, based on said position information, visual control information showing the position of said at least one hand of the colorist versus at least one grading control element of the color grading station, and
  generate a video stream comprising said visual control information and said graded VR content,
  a head mounted display configured to display said visual control information together with said graded VR content in order to help the colorist manipulating said at least one grading control element.

In a particular embodiment, said camera is placed above control elements of the color grading station.

According to a particular embodiment, the head mounted display displays the VR content and the visual control information are displayed in a same area, the visual control information being superimposed on the virtual reality video content.

In a variant, the visual control information is displayed next to the VR content to be graded. The VR content is displayed in a first area of the HMD while the visual control information is displayed in a second area of the display, said second area being distinct from the first area. In this case, the field of view dedicated to the VR content in the HMD is reduced to display hand position information and the control element information.

4. BRIEF DESCRIPTION OF THE DRAWINGS

The disclosure can be better understood with reference to the following description and drawings, given by way of example and not limiting the scope of protection, and in which.

Figure 1:
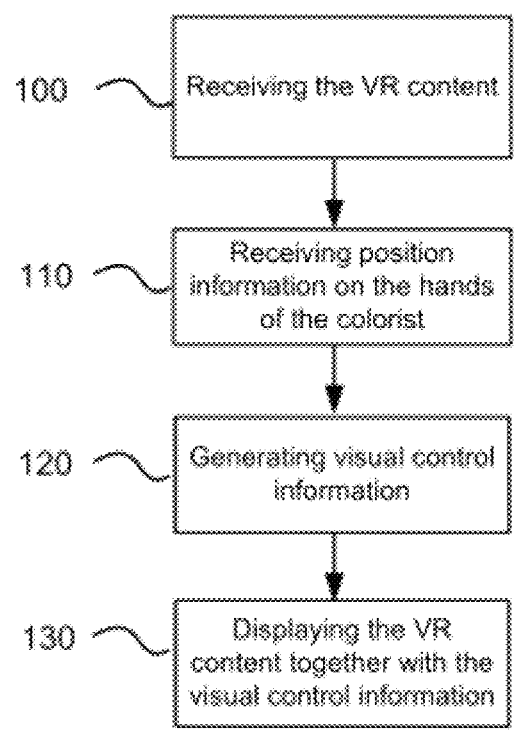
FIG. 1 is a flow chart of the successive steps implemented when performing a method for providing assistance to a colorist in color grading of a virtual reality video content according to one embodiment of the disclosure.

The components in the figures are not necessarily to scale, emphasis instead being placed upon illustrating the principles of the disclosure.

5. DESCRIPTION OF EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more details, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks. Specific structural and functional details disclosed herein are merely representative for purposes of describing example embodiments of the present disclosure. This disclosure may, however, be embodied in many alternate forms and should not be construed as limited to only the embodiments set forth herein.

FIG. 1 shows a flow chart of steps of the method according to an embodiment of the disclosure. This method is defined for helping a colorist to grade a VR content by using a color grading station and a HMD for displaying the graded VR content. The color grading station may be a classical color grading station with its associated tools. The color grading station comprises at least one grading control element like a button, a slider, a knob or a joystick. The colorist controls the color grading by manipulating the grading control elements by at least one of his two hands.

While visualizing the VR content to be graded in the HMD, the colorist loses the position of the grading control elements in front of him. The colorist needs to know the position of his hands versus the grading control elements of the color grading station in order to carry out the color grading operation of the VR content. To this end, visual information representative is displayed together with the VR content on the HMD to help the colorist manipulating the control elements of the color grading station.

In a first step 100, the VR content being graded by the color grading station is received by a processing device.

In a second step 110, position information representative of the position of at least one hand of the colorist above the color grading station is received. The position information may be based on video images captured by a camera placed above the color grading station.

The position information is generated by the camera generating the video images or by any other external device receiving the video images from the camera.

The position of the colorist's hands in the 3D space in front of him may be evaluated by known algorithms of pose estimation. In a luminous environment, this pose estimation may be performed by image processing based on skin tone and shape recognition.

For a more robust pose estimation, the colorist may for instance wear gloves equipped with dedicated markers. The position of the dedicated markers is then sensed by dedicated sensors and transmitted to the HMD.

The position of the control elements of the color grading station may be also estimated from the video images from the camera above the color grading station. In a variant, as for the hands of the colorist, the position of the control elements of the color grading station may be estimated by dedicated markers placed on gloves worn by the colorist.

In another variant, the position of the color grading station being fixed, its position and the position of its control elements may be predetermined in a set-up phase.

In another variant, the position of the control elements is estimated based on the position of the hands at the beginning of the color grading operation. For example, at the beginning of the process, the colorist places its hands successively on the different control elements of the color grading station such that the sensed position of the hands at this stage of the process gives the position of the control elements of the color grading station. Knowing the position of the hands and the position of the grading control elements, it is possible to generate a representation of the hands and the grading control elements close to the hands. This representation could for instance be a compositing of the hand, segmented out of video captured by a camera placed above the color grading station and a known representation of the color grading station. The hands may also be virtual, animated like avatar hands, and driven by the colorist's hands pose estimation. Thus, in a step 120, visual control information showing the position of the hands of the colorist versus the grading control elements of the color grading station is generated based on the position information.

In step 130, the visual control information together with the graded VR content are displayed on the HMD carried by the colorist in order to help him manipulating the grading control elements of the color grading station.

In a particular embodiment, the visual control information is displayed next to the VR content being graded. The VR content is displayed in a first area of the HMD while the visual control information is displayed in a second area of the HMD, said second area being distinct from the first area. In this case, the field of view dedicated to the VR content in the HMD is reduced to display the visual control information.

Figure 2:
FIG. 2 is a 360° VR content to be displayed by a head mounted display.
Figure 3:
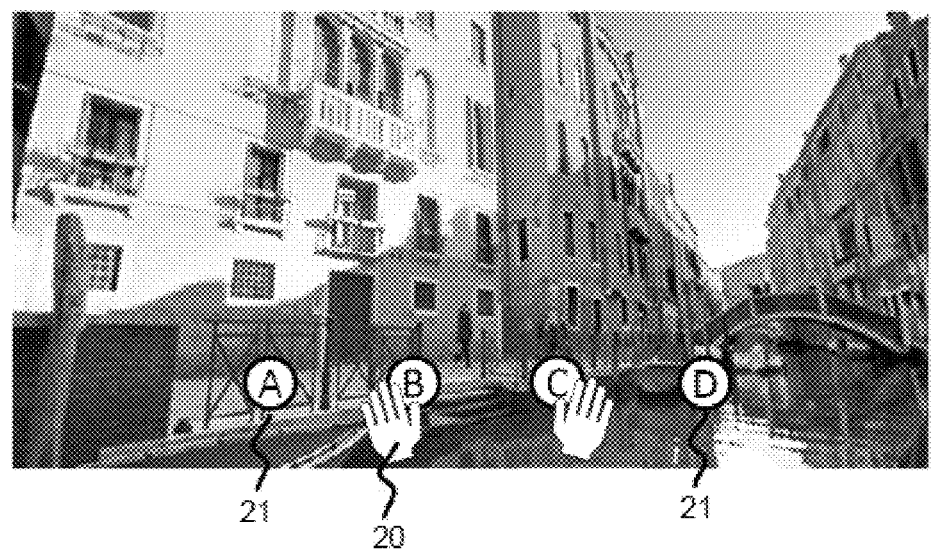
FIG. 3 is the part of the 360° VR content of FIG. 2 displayed by a head mounted display as proposed according to one embodiment of the disclosure.

In a variant, the VR content and the visual control information are displayed in a same area of the head mounted display, the visual control information being superimposed on the VR content. The VR content is displayed full screen, and the visual control information is displayed in semi-transparency mode overlaid onto the VR content. FIG. 2 represents a 360° scene 22 to be displayed by a HMD. FIG. 3 shows the part of the scene of FIG. 2 displayed by the HMD for a given position of the colorist's head. Virtual hands 20 and virtual grading control elements 21 are overlaid on this part of scene in order to help the colorist manipulating the control elements of the color grading station. In FIG. 3, four control buttons A, B, C and D are shown.

The level of transparency could be adjusted for instance by a foot pedal. When this foot pedal is released, only the VR content is displayed in the HMD while the visual control information is hidden. The more the foot pedal is pressed, the more the visual control information is visible in front of the VR content. In this embodiment, the colorist can access the grading control elements when needed without removing his HMD, only by pressing the foot pedal.

Note that in a special embodiment, and to reduce the size of the virtual control position in the HMD display, only the grading control elements close to each hand are displayed.

Thus, visual information about the colorist's hands and color grading station are integrated into the VR view, therefore offering the possibility for the colorist to interact with his color grading station, while simultaneously visualizing the content in a HMD.

The present disclosure also addresses the issue of navigating within the VR content while being able to access the color grading station. The colorist should be able to validate his grading by navigating or rotating in the 360° VR content. However, to view the content behind him normally, he would need to physically rotate 180°, meaning that he would no longer be able to use the commands on the color grading station as they would no longer be in front of him.

Figure 4:
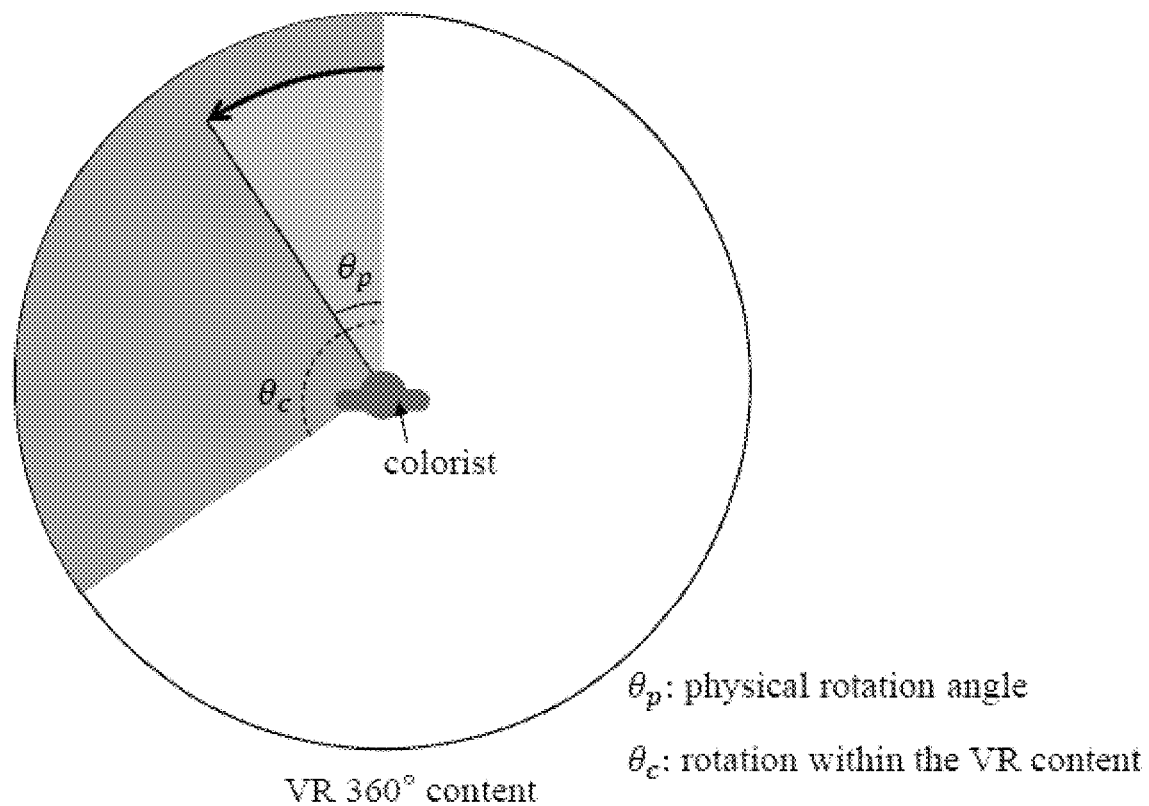
FIG. 4 illustrates a mapping operation according to one embodiment of the disclosure.

To address this issue, the physical rotation angle qr of the HMD is corrected by a coefficient mapping it to a larger angle of rotation within the VR content 6 C, and therefore speeding up the navigation in the VR content. For instance, a physical movement of the HMD by 60° from the initial position, is mapped to a rotation of 180° in the VR content by a mapping coefficient or mapping ratio. This ratio may be a constant whose value is obtained by a trade-off between the amplitude of the physical movement required to visualize the 360°, and the speed of rotation in the VR content. Formally, the mapping may be expressed as 6 C=k*qr where 0 C is the rotation within the VR content, qr is the physical rotation of the colorist or his head and k is a ratio (or coefficient) for example set to 3. This mapping operation is illustrated in FIG. 4.

This feature allows improving the ability for the colorist to navigate within the 360° VR content. In real viewing conditions, the 360° content can be typically explored by rotating the HMD either by moving the head of the user or the user moving totally. To manipulate aspects of the content, for instance in gaming applications, the user will normally hold a controller such as a game controller in their hands, which can be moved with them. In the present use case of color grading however, the color grading station used by the colorist is fixed in place and may be too impractical or even impossible to move. As such, the colorist must be able to access his physical grading control elements in front of him, while being able to explore the full 360° of the VR content.

In an alternative implementation, the mapping between the physical rotation angle qr and the VR content rotation angle 0 C is defined as a non-linear function, such that movements of the colorist closer to their initial position would lead to smaller rotations of the content, while larger movements would lead to progressively larger rotations of the content. This implementation would ensure that the colorist could use small movements to explore the viewpoint currently in front of them, while they would use larger movements to rotate to another part of the VR scene.

The present disclosure also relates to a processing device for providing assistance to a colorist in color grading of a virtual reality video content, called VR content, said processing device being configured to
receive the VR content being graded by a color grading station,
receive position information representative of the position of at least one hand of a colorist versus said color grading station,
generate, based on said position information, visual control information showing the position of the hands of the colorist versus at least one grading control element of the color grading station, and
generating a video stream comprising the visual control information and the graded VR content, the video stream being arranged to be displayed by a head mounted display carried by said colorist such that said visual control information is displayed together with said graded VR content in order to help the colorist manipulating said at least one grading control element.

The position information may be video images captured by a camera placed above the color grading station.

Figure 5:
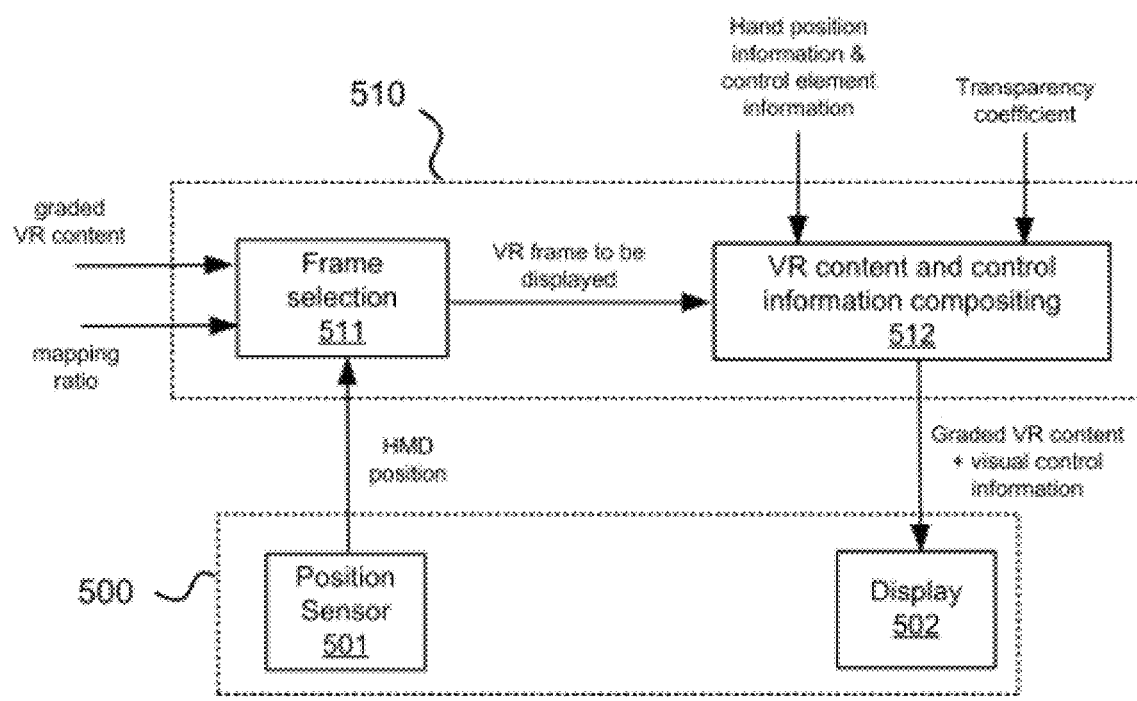
FIG. 5 is a schematic view of a processing device according to one embodiment of the disclosure.

This processing device is arranged to receive the graded VR content from the color grading station, receive the position information from the camera above the color grading station and to transmit the video stream to the head mounted display. FIG. 5 is a schematic view of a head mounted display 500 cooperating with a processing device 510 according one embodiment of the disclosure. The head mounted display 500 comprises
a position sensor 501 for detecting the position of the HMD, and
a display 502 for displaying the VR content composited by the processing device 510.

The processing device 510 comprises
a frame selection module 511 receiving the VR content graded or to be graded by the color grading station, the mapping ratio for correcting the rotation of the HMD versus the rotation within the VR content, and the HMD position,
a processing module 512 for compositing a graded VR content as defined above based on the graded frames from the frame selection module, the control information about the position of hands of the colorist and the position of the control elements of the color grading station and possibly a transparency coefficient.

All or parts of the processing device 510 may be incorporated into the color grading station and/or the head mounted display. It may also be an external device.

Figure 6:
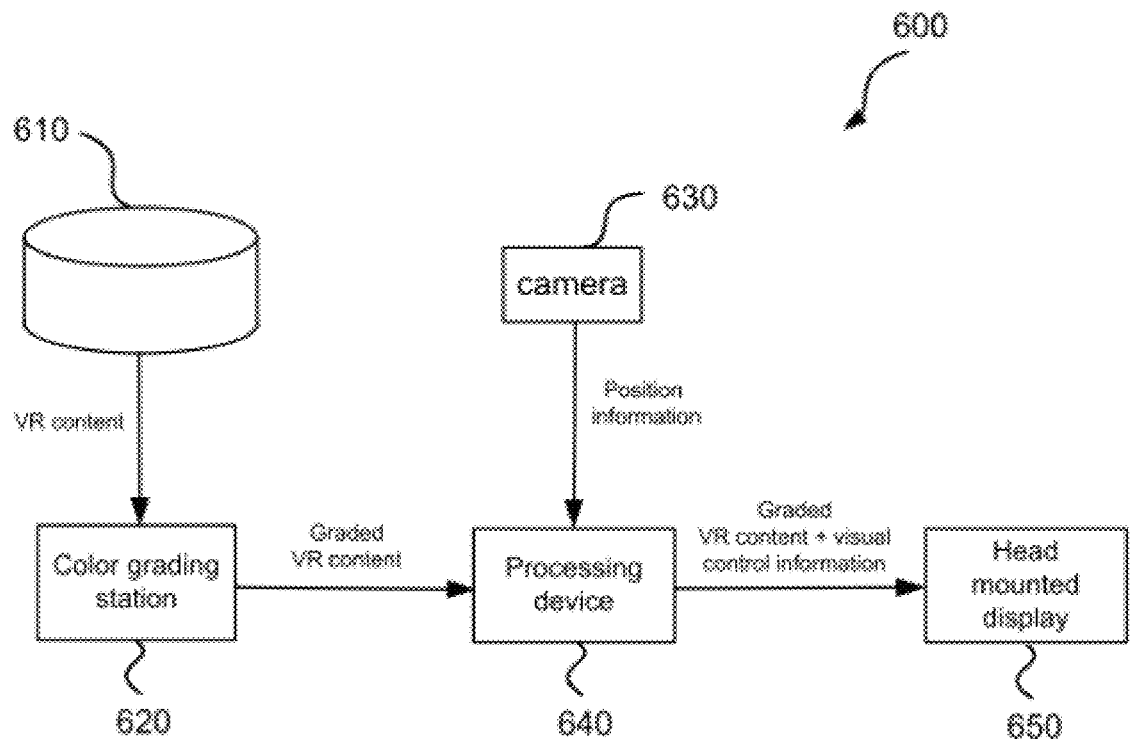
FIG. 6 is a schematic view of a global system according to one embodiment of the disclosure.

FIG. 6 illustrates a system for color grading a VR content according to one embodiment of the disclosure. It comprises
a storage module 610 for storing the VR content to be graded,
a color grading station 620 for color grading the VR content, the color grading station comprising grading control elements for controlling the grading of the VR content,
a camera 630 above the color grading station for capturing video images of at least one hand of the colorist and generating position information representative of the position of hands of the colorist versus a color grading station,
a processing device 640 for generating, based on the position information from the camera 630, visual control information showing the position of the hands of the colorist versus at least one grading control element of the color grading station, and generating a video stream comprising the visual control information and the graded VR content, and—a HMD 650 for receiving the video stream generated by the processing device 640 and displaying the VR content graded by the color grading station together with visual control information helping the colorist to manipulate the control elements of the color grading station while visualizing the graded VR content.

All or parts of the processing device 640 may be incorporated into the color grading station 620 and/or the head mounted display 650.

Thanks to the embodiments of the disclosure, a colorist can easily interact with the color grading station while visualizing the VR content in a HMD.

Although some embodiments of the present disclosure have been illustrated in the accompanying Drawings and described in the foregoing Detailed Description, it should be understood that the present disclosure is not limited to the disclosed embodiments, but is capable of numerous rearrangements, modifications and substitutions without departing from the disclosure as set forth and defined by the following claims.

The invention claimed is:

1. Method for color grading a virtual reality video content, called VR content, said method being executed by a head-mounted display worn by a colorist color grading said VR content and comprising:
   receiving the VR content being graded by an external color grading station, used by said colorist to color grade said VR content, comprising grading control elements for controlling the grading of said VR content;
   receiving position information representative of the position of at least one hand of the colorist versus said color grading station, said position information comprising the position of the at least one hand of the colorist above the color grading station and the position of the grading control elements of the color grading station;
   generating, based on said received position information, visual control information showing the position of said at least one hand of the colorist and at least one grading control element of the color grading station close to said at least one hand; and
   displaying said visual control information together with the graded VR content in order to help the colorist manipulating said at least one grading control element.

2. Method according to claim 1, wherein the visual control information is displayed next to the VR content being graded.

3. Method according to claim 1, wherein the VR content and the visual control information are displayed in a same area of the head mounted display, the visual control information being superimposed on the VR content.

4. Method according to claim 3, wherein the VR content is displayed full screen, and the visual control information are displayed in semi-transparency mode overlaid onto the VR content.

5. Method according to claim 1, wherein the position information is based on video images captured by a camera placed above the color grading station.

6. Method according to claim 1, wherein the visual control information are virtual images of the at least one hand of the colorist and the grading control elements of the color grading station.

7. Method according to claim 1, wherein the position of the at least one hand of the colorist versus the color grading station is estimated by detecting skin tones in video images captured by a camera placed above the color grading station.

8. Method according to claim 1, wherein the position of the at least one hand of the colorist versus a color grading station is estimated by dedicated markers placed on the hands of the colorist.

9. Method according to claim 1, wherein, the head mounted display being arranged to estimate a physical rotation of the colorist, the method further comprises a step for mapping to said physical rotation a rotation within the VR content, called VR content rotation, said VR content rotation being greater than said physical rotation, the VR content being displayed with said VR content rotation on said head mounted display.

10. Method according to claim 9, wherein a ratio between the VR content rotation and the physical rotation is a constant value greater than 1.

11. Head-Mounted device configured to assist a colorist in color grading a virtual reality content, called VR content, characterized in that it is configured to
   receive the VR content being graded by an external color grading station, used by said colorist to color grade said VR content, comprising grading control elements for controlling the grading of said VR content;
   receive position information representative of the position of at least one hand of the colorist versus said color grading station, said position information comprising the position of the at least one hand of the colorist above the color grading station and the position of the grading control elements of the color grading station;
   generate, based on said received position information, visual control information showing the position of said at least one hand of the colorist and at least one grading control element of the color grading station close to said at least one hand; and
   generate a video stream comprising said visual control information and said graded VR content, said video stream being arranged to be displayed by the head-mounted display such that said visual control information is displayed together with said graded VR content in order to help the colorist manipulating said at least one grading control element.

12. System for color grading a virtual reality video content comprising:
   a color grading station for grading said virtual reality video content, said color grading station comprising control elements for controlling the grading of the virtual reality video content;
   a camera for capturing video images of at least one hand of a colorist using said color grading station and generating position information representative of the position of at least one hand of the colorist and position information of said color grading station;
   a processing device configured to:
   receive the virtual reality video content being graded by the color grading station and said position information;
   generate, based on said position information, visual control information showing the position of said at least one hand of the colorist and at least one grading control element of the color grading station close to said at least one hand; and
   generate a video stream comprising said visual control information and said graded VR content;
   the system further comprising a head mounted display configured to display said visual control information together with said graded VR content in order to help the colorist manipulating said at least one grading control element.

13. System according to claim 12, wherein said camera is placed above the color grading station.

14. System according to claim 12, wherein the head mounted display is arranged to display the VR content and the visual control information in a same area of the display, the visual control information being superimposed on the VR content.

* * * * *